United States Patent [19]
Brown et al.

[11] 3,841,044
[45] Oct. 15, 1974

[54] RESILIENT BUFFER ASSEMBLY

[75] Inventors: Martin M. Brown, Birmingham; Lawrence Krawczak, Detroit, both of Mich.

[73] Assignee: Robin Products, Warren, Mich.

[22] Filed: Sept. 21, 1972

[21] Appl. No.: 290,978

[52] U.S. Cl. ............... 52/716, 16/86 R, 24/73 PM, 248/345.1, 293/1, 293/62, 293/65, 293/71 R
[51] Int. Cl. ...... B60r 19/08, E04c 2/44, E04f 19/02
[58] Field of Search ...... 16/86, 86 R; 24/73, 73 PM; 248/188.8, 345.1; 293/1, 64, 65, 66, 67, 70, 293/71 R, 62; 52/716, 717, 718

[56] References Cited
UNITED STATES PATENTS

| | | | |
|---|---|---|---|
| 1,915,249 | 6/1933 | Jorgensen | 248/345.1 |
| 1,936,113 | 11/1933 | Jelliffe | 248/188.8 |
| 1,978,249 | 10/1934 | Decarie | 16/86 |
| 2,030,255 | 2/1936 | Howard | 293/71 R X |
| 2,128,656 | 8/1938 | Long | 293/66 |
| 2,585,438 | 2/1952 | Clingman | 16/86 |
| 3,122,804 | 3/1964 | Stawinski | 24/73 |
| 3,251,103 | 5/1966 | Saut | 24/73 PM |
| 3,310,929 | 3/1967 | Garvey | 52/717 |
| 3,563,595 | 2/1971 | Slavney | 293/71 R X |
| 3,645,575 | 2/1972 | Slavney | 293/71 R X |

FOREIGN PATENTS OR APPLICATIONS

| | | | |
|---|---|---|---|
| 69,140 | 4/1958 | France | 293/65 |
| 698,212 | 11/1965 | Italy | 293/64 |
| 1,020,698 | 2/1966 | Great Britain | 293/65 |

*Primary Examiner*—M. Henson Wood, Jr.
*Assistant Examiner*—Howard Beltran

[57] ABSTRACT

This disclosure relates to a trim or molding assembly and method of assembling a trim strip or molding to a support. The assembly includes a resilient polymeric trim strip suitable for use as a bumper guard, or the like, which is secured to the support in overlying relation. The trim strip includes a plurality of integral connectors which permit quick assembly of the strip to the supporting member and reduces the assembly cost and time. The connectors are integral with the trim strip in the preferred embodiment, wherein the connectors are tubular projections, generally eliptical in cross section, with cam locking projections on the elongated sides of the connectors. The tubular connectors are resiliently collapsed, in the disclosed method of assembly, by the caming projections, as the connectors are received through the apertures provided in the support. The other disclosed trim assembly embodiments include headed fasteners projecting from the support which are received within and secured directly to the trim strip, eliminating the adapter or clip required in the conventional or commercial systems.

12 Claims, 6 Drawing Figures

PATENTED OCT 15 1974 3,841,044
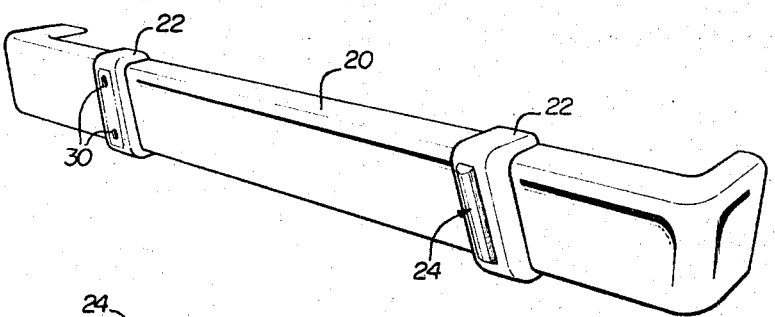
FIG. 1
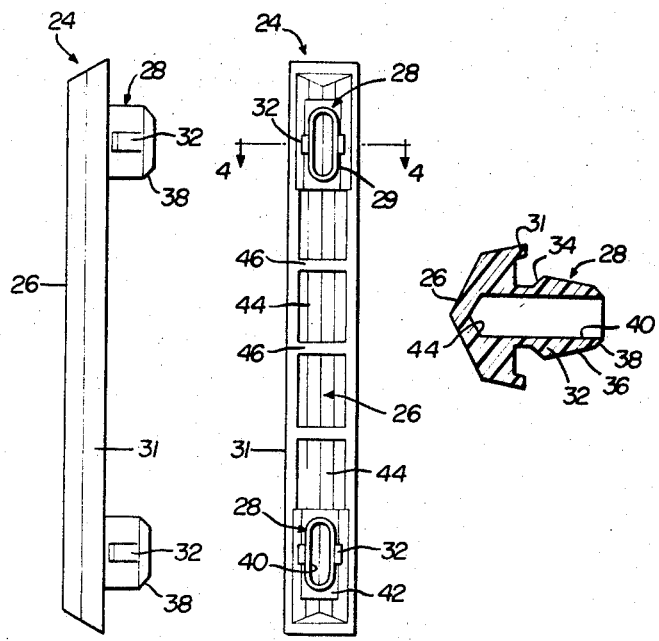
FIG. 2    FIG. 3    FIG. 4    FIG. 5
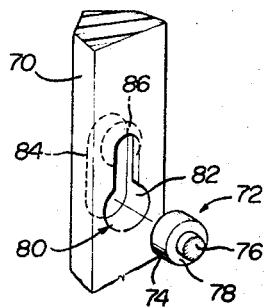
FIG. 6
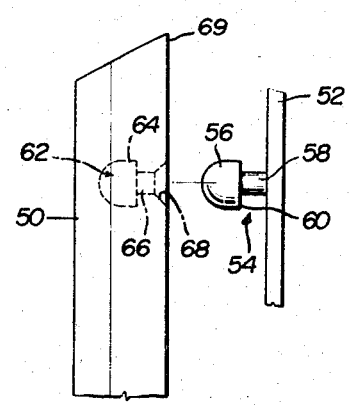

RESILIENT BUFFER ASSEMBLY

FIELD OF THE INVENTION

The resilient molding assembly of this invention includes a polymeric or plastic trim strip having a plurality of integral connector means. The connector means in the preferred embodiment of the trim strip are integral tubular projections, however the more conventional headed fasteners may also be utilized in the trim strip of this invention, wherein the fasteners are received within integral female connectors provided in the trim strip.

The trim assembly of this invention eliminates the requirement of a separate adapter or clip which is utilized in the conventional automotive molding assembly. The adapter or clip is first received on the headed fastener in the conventional system and the molding or trim strip is then snapped or telescopically received over the adapter or clip. The adapter or clip may also be received within the trim strip, prior to assembly, and the molding is then snapped or otherwise secured to the headed fasteners, interconnecting the adapters or clips to the fasteners.

The resilient trim assembly of this invention serves two primary functions. The trim strip may be utilized for decorative purposes in automotive or appliance applications and the projecting trim strip serves to protect the supporting member. The more conventional metal moldings and trim strips also provide these advantages, however the protection provided by a metal trim strip is minimal and the trim is easily damaged. More recently, metal trim strips have been provided with plastic inserts, however these structures are relatively expensive and still result in a metal-to-metal contact between the metal trim strip and the body panel of an automobile, for example. The trim strip of this invention provides greater protection for the supporting member and is not easily damaged. Further, the trim strip of this invention eliminates the metal-to-metal contact, because the trim strip itself is preferably plastic or polymeric.

The resilient trim assembly of this invention includes a supporting member, such as an automotive panel or bumper which is adapted to receive the resilient trim member in overlying relation. The trim member includes a plurality of integral connector means which are adapted to interconnect the supporting member and the trim member. One of the members includes a plurality of connectors which project from the surface of the member and include a locking portion which overlies the surface including the connector. The opposed member includes a plurality of apertures which receive the connectors and bias the trim member against the support.

In one of the preferred embodiments of the resilient trim strip, the connector means includes a plurality of integral tubular connectors extending from the surface of the trim strip, overlying the support. The tubular connectors are generally elliptical in cross section with the elongated sides generally parallel, preferably parallel to the lateral sides of the strip. Each of the connectors includes an integral camming projection which resiliently collapses the tubular connector inwardly as the connectors are inserted into generally elliptical apertures in the supporting surface. The camming projections in the disclosed embodiment of the trim strip are generally triangular in cross section with the apex of the triangle projecting from the elongated sides of the connectors. The leg of the triangular projection, opposite the trim strip, is preferably shorter than the opposed leg, to provide a locking edge which biases the trim strip against the supporting surface. The trim strip is then secured to the support by indexing the strip, relative to the support, to align the connectors and the apertures formed in the support and biasing the trim strip toward the support. The camming projects resiliently collapse the tubular projections, as described above, to lockingly receive the connectors in the apertures.

The remaining embodiments of the resilient trim assembly of this invention include a headed fastener which is secured to the support and the integral connector means of the trim strip is provided by a plurality of configured openings which receive and secure the headed fastener. In one of the disclosed embodiments, the headed fastener includes a generally spherical head portion and a reduced shank portion and the trim member includes a complimentary configured aperture including a reduced diameter portion which receives the shank portion of the fastener and a hemispherical portion which receives the head portion of the fastener. The spherical head portion of the fastener resiliently enlarges the reduced diameter portion of the aperture, permitting the head portion to be received within the hemispherical opening and retaining the resilient trim member on the support. The other embodiment of the trim assembly includes a plurality of headed fasteners and the trim member is provided with keyhole slots which resiliently retain the strip on the support.

It will be understood that the trim assembly and resilient trim member of this invention may be utilized in various applications, including trim strips and moldings for automotive applications and appliances. The instant application will be described in the context of an automotive trim assembly and more particularly a bumper guard to simplify the description.

Other objects, advantages and meritorious features of this invention will more fully appear from the following specification, claims and accompanying drawings, wherein:

BRIEF DESCRIPTION OF THE DRAWINGS

FIG. 1 is a perspective view of an automotive bumper including the resilient trim assembly of this invention;

FIG. 2 is a side view of one embodiment of the resilient trim strip of this invention;

FIG. 3 is a bottom view of the trim strip shown in FIG. 2;

FIG. 4 is an end cross sectional view of the trim strip shown in FIG. 3, in the direction of view arrows 4—4;

FIG. 5 is a side elevation of another embodiment of the trim assembly of this invention; and FIG. 6 is a bottom perspective view of another embodiment of the trim assembly of this invention.

DESCRIPTION OF THE PREFERRED EMBODIMENT

FIG. 1 of the drawings shows a suitable application for the resilient trim assembly of this invention. FIG. 1 shows a typical automotive bumper 20 having a pair of generally vertical metal bumper guards 22 secured to the bumper in spaced relation. The resilient trim strip 24 is secured to the bumper guards 22 in overlying relation and serves to protect the bumper guards from scratches and similar damage, especially when the bumper is contacted by another vehicle. The resilient trim member 24 is shown in detail in FIGS. 2 to 4.

The resilient trim strip shown in FIGS. 2 to 4 includes an elongated channel portion 26, which is the only exposed portion of the trim assembly as shown in FIG. 1. The disclosed embodiment of the trim strip includes a pair of integral connectors 28 which are received within the generally eliptical apertures 30 in the bumper guard, as shown in FIG. 1. The connectors are preferably tubular projections, as shown in FIGS. 2 and 3, and are generally eliptical in cross section with the opposed elongated sides 29 generally parallel to each other and to the lateral sides 31 of the channel strip 26.

The opposed elongated sides of the connectors are each provided with a cam lock 32 which retains the tubular connectors in the apertures 30 after securement. The cam locks are generally triangular in cross section, as shown in FIG. 4, with the leg 34 of the triangular projection adjacent the channel portion 26 shorter in length than the opposed leg 36 to provide a caming action as the connectors are received in the aperture 30. The tubular projection is resiliently collapsed inwardly, into the tubular opening 40, and the locking edge 34 is received against the opposed surface of the bumper guard, retaining the trim strip on the bumper. A chamfer 38 may also be provided on the work entering end of the projections to help the connectors into the openings. The connectors in the disclosed embodiment are integral with the trim strip and include an integrally formed base 42 provided within the channel shaped trim strip 26.

The channel 44 in the disclosed embodiment of the trim strip is generally V-shaped, as shown in FIG. 4, and is divided by a plurality of ribs 46 which bridge the opposed lateral sides 31 of the strip. This structure permits flexure of the resilient trim strip about an axis in the plane of the support, perpendicular to the lateral sides 31, and inhibits flexure about an axis perpendicular to the plane of the support, through the reinforcing ribs. This structure permits the resilient trim strip to conform to the surface of the support, which in this case is a bumper guard, and limits damage to the trim strip under impact forces.

The resilient trim strip shown in FIGS. 2 to 4 is secured to the bumper guard 22 in FIG. 1 by locating the connectors 28 in registry with the apertures 30 in the bumper guard and forcing the connectors into the apertures to lock the trim strip on the bumper guard. As the connectors are forced into the apertures 30, the faces 36 of the cam lock will resiliently collapse the tubular connectors, into the opening 40, to receive the locking portion 34 against the opposite peripheral edge defining the aperture in the bumper guard. This connection will resiliently bias the lateral sides 31 of the trim strip against the supporting surface of the guards 22 and retain the strip in position.

It will be understood that the preferred material for the resilient trim strip will depend upon the particular application. The integral connectors must be sufficiently resilient to permit receipt of the connectors within the apertures 30 and the channel shaped strip is preferably flexible to prevent damage due to impact. In the particular application shown in FIG. 1, the resilient trim strip must be able to withstand high impact loading and provide fast recovery after impact. A suitable material for the application shown in FIG. 1 is a high impact polyethylene sold by Dupont De Nemours EI & Co. under the trade name "Surlyn."

The embodiment of the trim member 50 shown in FIG. 5 is also secured to the support 52 by a snap-on-connection, however in this embodiment the male fastener 54 is provided on the support member, rather than the trim strip. The support 52 may be a bumper guard, as shown in FIG. 1, or other application requiring resilient trim strip.

The fastener element 54 includes a generally spherical head portion 56 and a smaller diameter cylindrical shank portion 58 which may be secured by any suitable means to the support 52, including welding or the like. The underside 60 of the head portion overlies the support 52 and provides the locking portion for the fastener.

The trim strip 50 is provided with an opening 62 complimentarily configured to receive the male fastener 54, including a hemispherical chamber or opening 64, a reduced diameter portion 66 which receives the shank portion 58 of the fastener and a conical opening 68 which opens into the bottom surface 69 of the trim strip, which overlies the panel. As the spherical head portion 56 of the fastener is forced into the conical opening 68, the reduced diameter opening 66 will spread to receive the head portion 56, into the hemispherical chamber 62. The reduced diameter opening 66 will then resiliently contract to receive the shank portion 58 of the male fastener and retain the male fastener within the female connector means 62.

The trim assembly shown in FIG. 6 also includes a headed male fastener 72 which is secured to the support (not shown) and is received within a female connector means 80 provided in the resilient trim strip 70. In this embodiment, the fastener 72 includes a cylindrical head portion 74 and a smaller diameter cylindrical shank portion 76. The head portion 74 overlies the support and provides the locking surface 78 which retains the resilient strip on the fastener.

The female connector means in the embodiment of the trim strip shown in FIG. 6 is a key-hole connection, including an enlarged diameter opening 82 which receives the head portion 74 of the fastener and a passage 84 generally perpendicular to the axis of the opening 82. The head portion of the male fastener is received within the enlarged opening 82 and the trim strip is shifted perpendicular to the axis of the fastener to receive the fastener head in the position shown at 86 in FIG. 6.

The embodiments of the resilient trim assembly shown in FIGS. 5 and 6 may be less desirable for the bumper guard application shown in FIG. 1 because the male fasteners are secured to the support and are subject to being broken from the support under impact loading. The male fasteners are generally metallic, such as stainless steel, and must be insulated from the impact surface of the resilient trim strip. In the embodiment shown in FIGS. 2 to 4, the impact loading does not affect the connection between the trim strip and the bumper guard.

We claim:

1. An elongated resilient trim member having a plurality of integral connectors projecting from the longitudinal axis of said trim member, each of said connectors being tubular, hollow and open at its distal end and having generally parallel side walls and an integral locking protuberance projecting from opposite sides of each of said side walls, said locking protuberances having a lead-in camming face inclined outwardly from said side walls, from said distal end, and a locking face extending toward said connectors from adjacent said camming face, whereby said side walls of the connectors are biased inwardly upon receipt in a mating aperture in generally parallel relation, maintaining the relative parallel relation of the opposed camming and locking faces during installation of the trim member.

2. The elongated trim member defined in claim 1, wherein said side walls of the connectors are joined by integral end walls, said end walls non-perpendicular and non-columnar to the parallel side walls, collapsing upon the inward biasing of the parallel side walls.

3. The elongated resilient trim member defined in claim 2, wherein said end walls are convex outwardly relative to the axis of said tubular projections and wherein said tubular projections are generally oval.

4. An elongated channel-shaped resilient polymeric trim member having a continuous bottom wall, opposed longitudinal side walls and an open longitudinal side, a plurality of integral connector units joined to said channel bottom wall and projecting beyond said side walls, each of said connectors having opposed relatively rigid side walls cantilevered from said channel bottom wall and generally parallel to said channel side walls, and each connector side wall having a locking projection on opposite sides of said connector side walls, including a camming face inclined toward the channel side wall from adjacent the distal end of said connector and a locking face extending from said camming face and overlying said channel bottom wall, generally parallel to the longitudinal distal edge of said channel side wall, the channel side walls of said connectors resiliently biased inwardly about their junction to said channel bottom wall, in generally parallel relation, during securement of said connectors in a rectangular panel opening.

5. The trim member defined in claim 4, wherein said connector units are tubular, having an open distal end and resilient end walls joining said side walls, permitting said side walls to freely flex inwardly about the cantilevered junction of said side walls to said channel bottom wall.

6. The trim member defined in claim 5, wherein said connector end walls are non-perpendicular and non-columnar to said side walls permitting said side walls to freely flex.

7. The trim member defined in claim 6, wherein said end walls are outwardly convex about the axis of said connectors to collapse outwardly upon inward biasing of said connector side walls.

8. A panel assembly comprising, in combination, a panel having a rectangular opening, a resilient polymeric channel having a continuous bottom wall overlying said panel in spaced relation, and side walls engaging one face of said panel, at least one connector unit integrally joined to said channel bottom wall and projecting beyond said side walls into said panel opening, said connector having opposed relatively rigid side walls cantilevered from said bottom wall, the opposite sides of said side walls having a camming face inclined outwardly from adjacent the distal end of said connector and a planar locking face inclined toward said side wall from adjacent said camming face and overlying said bottom wall, said locking faces engaging the opposed parallel edges of said panel opening opposite said one panel face and securely retaining said channel to said panel and said camming faces resiliently biasing said side walls toward each other, in relative parallel relation during receipt of said connector within said panel opening.

9. The panel assembly defined in claim 8, wherein said channel is an elongated trim member having a plurality of connector units and said panel has an equal number of openings, each receiving one of said connectors.

10. The panel assembly defined in claim 8, wherein said connector is tubular, having an open end and resilient end walls joining said side walls.

11. The panel assembly defined in claim 10, wherein said connector unit end walls are defined at an angle to said side walls, permitting said side walls to freely flex inwardly about said cantilevered junction to said channel bottom wall.

12. The panel assembly defined in claim 11, wherein said end walls are arcuate, convex outwardly relative to the axis of said connector and having a thickness less than the thickness of said connector side walls.

* * * * *